US012563609B2

(12) United States Patent (10) Patent No.: US 12,563,609 B2
Zhang et al. (45) Date of Patent: Feb. 24, 2026

(54) SOLUTION FOR PDU SESSION GRACEFUL LEAVING STATUS INDICATION

(71) Applicant: QUALCOMM Incorporated, San Diego, CA (US)

(72) Inventors: Juan Zhang, Beijing (CN); Lenaig Genevieve Chaponniere, La Jolla, CA (US); Gavin Bernard Horn, La Jolla, CA (US); Haris Zisimopoulos, London (GB); Amer Catovic, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/906,065

(22) PCT Filed: Apr. 16, 2020

(86) PCT No.: PCT/CN2020/085106
§ 371 (c)(1),
(2) Date: Sep. 9, 2022

(87) PCT Pub. No.: WO2021/208011
PCT Pub. Date: Oct. 21, 2021

(65) Prior Publication Data
US 2023/0120582 A1 Apr. 20, 2023

(51) Int. Cl.
*H04W 76/10* (2018.01)
*H04W 68/02* (2009.01)
*H04W 76/30* (2018.01)

(52) U.S. Cl.
CPC ........... *H04W 76/10* (2018.02); *H04W 68/02* (2013.01); *H04W 76/30* (2018.02)

(58) Field of Classification Search
CPC ..... H04W 76/10; H04W 68/02; H04W 76/30; H04W 76/22; H04W 76/12; H04W 8/183; H04W 60/00
(Continued)

(56) References Cited

U.S. PATENT DOCUMENTS

| 2012/0028657 A1 | 2/2012 | Chin et al. |
| 2019/0059067 A1 | 2/2019 | Lee et al. |

(Continued)

FOREIGN PATENT DOCUMENTS

| CN | 108574969 A | 9/2018 |
| WO | 2012015985 A1 | 2/2012 |

OTHER PUBLICATIONS

3GPP TR 23.761 V0.3.0 (Jan. 2020), Release 17 (Year: 2020).*

(Continued)

*Primary Examiner* — Nicholas A Jensen
*Assistant Examiner* — Oladiran Gideon Olaleye
(74) *Attorney, Agent, or Firm* — QUALCOMM Incorporated

(57) ABSTRACT

Aspects of the present disclosure relate to wireless communications, and more particularly, to techniques for improving data delivery in dual subscriber identity module (dual SIM) scenarios where a single radio resource is shared. One example method by a user-equipment (UE) generally includes sending a protocol data unit (PDU) session establishment request message to a network entity of a first radio access network (RAN) and including, in the PDU session establishment request message, an indication of how the UE wants the network entity to handle mobile terminated (MT) service delivery after the UE leaves the first RAN via a graceful leave procedure.

32 Claims, 9 Drawing Sheets

(58) Field of Classification Search

USPC ........................................................ 370/329

See application file for complete search history.

(56) References Cited

U.S. PATENT DOCUMENTS

| | | | |
|---|---|---|---|
| 2019/0082417 A1* | 3/2019 | Bolle | H04W 28/0268 |
| 2019/0349721 A1* | 11/2019 | Zhu | H04W 4/14 |
| 2020/0267533 A1* | 8/2020 | Zhang | H04W 4/80 |
| 2023/0136426 A1 | 5/2023 | Cheng et al. | |

OTHER PUBLICATIONS

Ericsson et al., "MUSIM Solutions for Key Issue 1," SAWG2 Meeting #136-AH, S2-2001722, Jan. 13-27, 2020 (Jan. 27, 2020), 4 pages, the whole document.

Ericsson: "MUSIM Solutions for Key Issue 3," SAWG2 Meeting #136-AH, S2-2000303, Jan. 13-27, 2020 (Jan. 27, 2020), 9 pages, sections 6.X-6.x.3.1.1.

International Search Report and Written Opinion—PCT/CN2020/ 085106—ISA/EPO—Jan. 18, 2021.

NEC, et al., "Solution X: Paging Delivery for USIM_2 While USIM_1 is in Connected Mode on the Same Network", SA WG2 Meeting #136, S2-1911347, Nov. 18-22, 2019 (Nov. 22, 2019), 3 pages, The whole document.

Ericsson, et al., "MUSIM Solutions for Key Issue 3", SA WG2 Meeting #136-AH, S2-2001719, 3rd Generation Partnership Project, Mobile Competence Centre, 650, Route Des Lucioles, F-06921 Sophia-Antipolis Cedex, France, vol. SA WG2, No. Incheon, Korea, Jan. 13, 2020-Jan. 27, 2020, Jan. 27, 2020, 9 Pages, XP052456470, the whole document.

LG Electronics: "Solution: Selective MT Service Configuration", 3GPP TSG-SA2 Meeting #136-AH, S2-2000651, 3rd Generation Partnership Project, Mobile Competence Centre, 650, Route Des Lucioles, F-06921 Sophia-Antipolis Cedex, France vol. SA WG2, No. Incheon, Korea (Republic Of), Jan. 13, 2020-Jan. 17, 2020, Jan. 7, 2020, 4 Pages, XP052455479, the whole document.

Nokia, et al., "Solution for Improved Paging in MUSIM Devices (KI#1,2,3)", SA WG2 Meeting #136-AH, S2-2000855, 3rd Generation Partnership Project, Mobile Competence Centre, 650, Route Des Lucioles, F-06921 Sophia-Antipolis Cedex, France vol. SA WG2, No. Incheon, Korea, Jan. 13, 2020-Jan. 17, 2020, Jan. 7, 2020, 7 Pages, XP052455680, the whole document.

OPPO, et al., "Solution for Key Issue#1 Handling of MT Service", SA WG2 Meeting #136 AH, S2-2000308, 3rd Generation Partnership Project, Mobile Competence Centre, 650, Route Des Lucioles, F-06921 Sophia-Antipolis Cedex, France vol. SA WG2, No. Incheon, Korea, Jan. 13, 2020-Jan. 17, 2020, Jan. 7, 2020, 7 Pages, XP052455143, the whole document.

Supplementary European Search Report—EP20931415—Search Authority—Munich—Dec. 12, 2023.

CATT: "Discussions on Type II CSI Enhancement", 3GPP Draft, 3GPP TSG RAN WG1 Ad-Hoc Meeting 1901, R1-1900338, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593252, 16 Pages, Section 1, p. 1 Section 2.4.2, p. 13-p. 15, figure 6.

Qualcomm Incorporated: "Two Step Signalling Connection Handling for Pause and Restart Procedure", SA WG2 Meeting #136AH, S2-2000121, Jan. 13-17, 2020, Incheon, Korea, 4 Pages.

\* cited by examiner

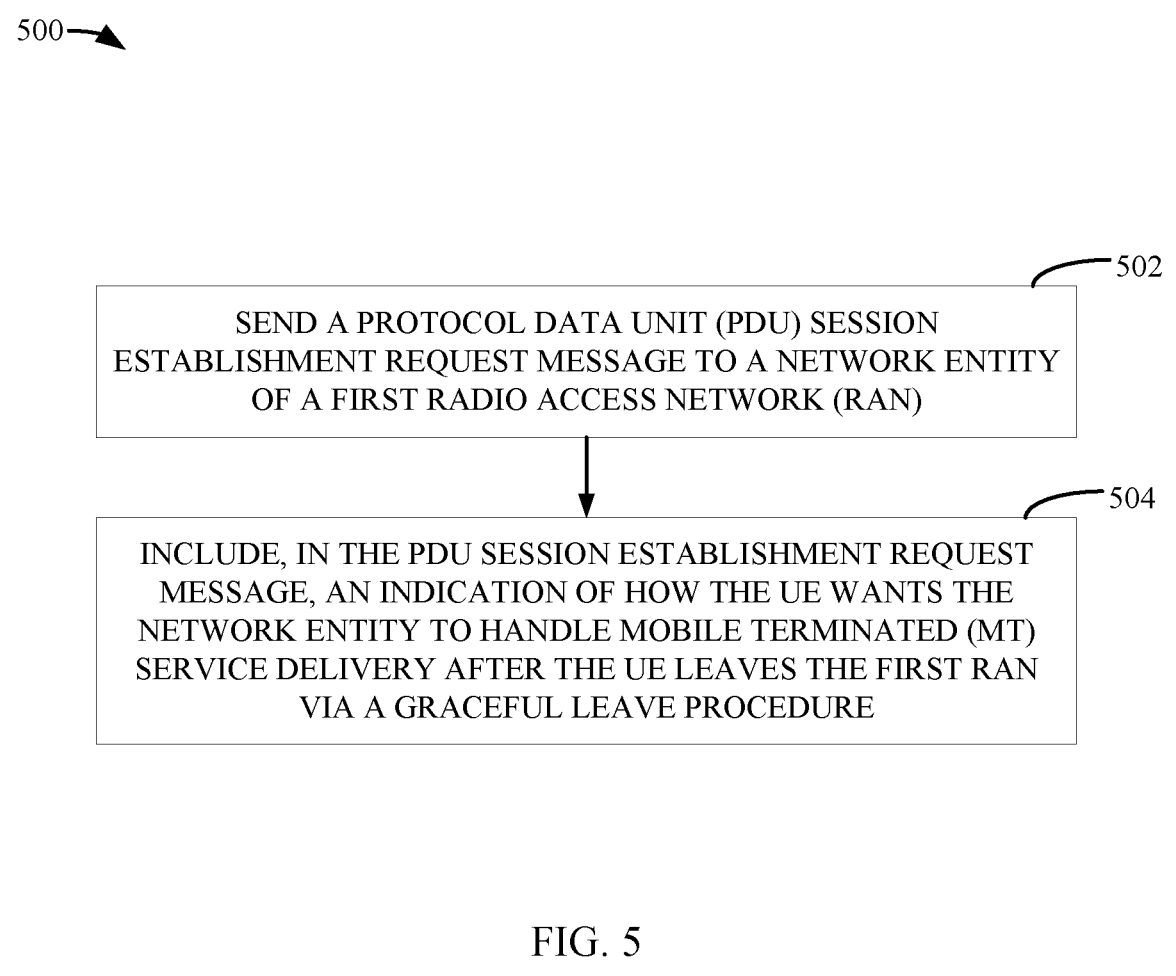

500 —▲

502

SEND A PROTOCOL DATA UNIT (PDU) SESSION
ESTABLISHMENT REQUEST MESSAGE TO A NETWORK ENTITY
OF A FIRST RADIO ACCESS NETWORK (RAN)

504

INCLUDE, IN THE PDU SESSION ESTABLISHMENT REQUEST
MESSAGE, AN INDICATION OF HOW THE UE WANTS THE
NETWORK ENTITY TO HANDLE MOBILE TERMINATED (MT)
SERVICE DELIVERY AFTER THE UE LEAVES THE FIRST RAN
VIA A GRACEFUL LEAVE PROCEDURE

FIG. 5

600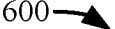

602

RECEIVE, FROM A USER EQUIPMENT (UE), A PROTOCOL DATA UNIT (PDU) SESSION ESTABLISHMENT REQUEST MESSAGE, WHEREIN THE PDU SESSION ESTABLISHMENT REQUEST MESSAGE INCLUDES A GRACEFUL LEAVE STATUS INDICATION INFORMATION ELEMENT (IE) THAT INDICATES HOW THE UE WANTS THE NETWORK ENTITY TO HANDLE MOBILE TERMINATED (MT) SERVICE DELIVERY AFTER THE UE LEAVES THE FIRST RAN VIA A GRACEFUL LEAVE PROCEDURE

604

SEND, TO THE UE A PDU SESSION ESTABLISHMENT COMMAND MESSAGE, WHEREIN THE PDU SESSION ESTABLISHMENT COMMAND MESSAGE INCLUDES A GRACEFUL LEAVE STATUS RESPONSE IE THAT INDICATES HOW THE NETWORK ENTITY WILL HANDLE THE MT SERVICE DELIVERY AFTER THE UE LEAVES THE FIRST RAN VIA THE GRACEFUL LEAVE PROCEDURE

SOLUTION FOR PDU SESSION GRACEFUL LEAVING STATUS INDICATION

CROSS-REFERENCE TO RELATED APPLICATIONS

This application is a national stage application under 35 U.S.C. 371 of PCT/CN2020/085106, filed Apr. 16, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for coordinating how to handle mobile terminated (MT) data delivery when a user equipment leaves one network to another network.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performance of UEs operating with multiple subscriber identity modules (SIMs).

Certain aspects provide a method for wireless communication by a user-equipment (UE). The method generally includes sending a protocol data unit (PDU) session establishment request message to a network entity of a first radio access network (RAN) and including, in the PDU session establishment request message, an indication of how the UE wants the network entity to handle mobile terminated (MT) service delivery after the UE leaves the first RAN via a graceful leave procedure.

Certain aspects provide a method for wireless communication by a network entity. The method generally includes receiving, from a user equipment (UE), a protocol data unit (PDU) session establishment request message, wherein the PDU session establishment request message includes a graceful leave status indication information element (IE) that indicates how the UE wants the network entity to handle mobile terminated (MT) service delivery after the UE leaves the first RAN via a graceful leave procedure and sending, to the UE, a PDU session establishment accept message, wherein the PDU session establishment accept message includes a graceful leave status response IE that indicates how the network entity will handle the MT service delivery after the UE leaves the first RAN via the graceful leave procedure.

Certain aspects provide a first user equipment (UE). The first UE generally includes means for sending a protocol data unit (PDU) session establishment request message to a network entity of a first radio access network (RAN) and means for including, in the PDU session establishment request message, an indication of how the UE wants the network entity to handle mobile terminated (MT) service delivery after the UE leaves the first RAN via a graceful leave procedure.

Certain aspects provide a network entity of a first radio access network (RAN). The network entity generally includes means for receiving, from a user equipment (UE), a protocol data unit (PDU) session establishment request message, wherein the PDU session establishment request message includes a graceful leave status indication information element (IE) that indicates how the UE wants the network entity to handle mobile terminated (MT) service delivery after the UE leaves the first RAN via a graceful leave procedure and means for sending, to the UE, a PDU session establishment command message, wherein the PDU session establishment command message includes a graceful leave status response IE that indicates how the network entity will handle the MT service delivery after the UE leaves the first RAN via the graceful leave procedure.

Certain aspects provide a first user equipment (UE). The first UE generally includes a transmitter configured to send a protocol data unit (PDU) session establishment request message to a network entity of a first radio access network (RAN) and a processing system configured to include, in the PDU session establishment request message, an indication of how the UE wants the network entity to handle mobile terminated (MT) service delivery after the UE leaves the first RAN via a graceful leave procedure.

Certain aspects provide a network entity of a first radio access network (RAN). The network entity generally includes a receiver configured to receive, from a user equipment (UE), a protocol data unit (PDU) session establishment request message, wherein the PDU session establishment request message includes a graceful leave status indication information element (IE) that indicates how the UE wants the network entity to handle mobile terminated (MT) service delivery after the UE leaves the first RAN via a graceful leave procedure and a transmitter configured to send, to the UE, a PDU session establishment command message, wherein the PDU session establishment command message includes a graceful leave status response IE that indicates how the network entity will handle the MT service delivery after the UE leaves the first RAN via the graceful leave procedure.

Certain aspects provide an apparatus for wireless communications by a first user equipment (UE). The apparatus generally includes a processing system configured to generate a protocol data unit (PDU) session establishment request message and an interface configured to output the PDU session establishment request message for transmission to a network entity of a first radio access network (RAN), wherein the processing system is further configured to include, in the PDU session establishment request message, an indication of how the UE wants the network entity to handle mobile terminated (MT) service delivery after the UE leaves the first RAN via a graceful leave procedure.

Certain aspects provide an apparatus for wireless communications by a network entity of a first radio access network (RAN). The apparatus generally includes an interface configured to obtain, from a user equipment (UE), a protocol data unit (PDU) session establishment request message, wherein the PDU session establishment request message includes a graceful leave status indication information element (IE) that indicates how the UE wants the network entity to handle mobile terminated (MT) service delivery after the UE leaves the first RAN via a graceful leave procedure and a processing system configured to a PDU session establishment command message, wherein the PDU session establishment command message includes a graceful leave status response IE that indicates how the network entity will handle the MT service delivery after the UE leaves the first RAN via the graceful leave procedure, wherein the interface is further configured to output the PDU session establishment command message for transmission to the UE.

Certain aspects provide a non-transitory computer-readable medium for wireless communications by a first user equipment (UE). The non-transitory computer-readable medium generally includes instructions executable to send a protocol data unit (PDU) session establishment request message to a network entity of a first radio access network (RAN) and include, in the PDU session establishment request message, an indication of how the UE wants the network entity to handle mobile terminated (MT) service delivery after the UE leaves the first RAN via a graceful leave procedure.

Certain aspects provide a non-transitory computer-readable medium for wireless communications by a network entity. The non-transitory computer-readable medium generally includes instructions executable to receive, from a user equipment (UE), a protocol data unit (PDU) session establishment request message, wherein the PDU session establishment request message includes a graceful leave status indication information element (IE) that indicates how the UE wants the network entity to handle mobile terminated (MT) service delivery after the UE leaves the first RAN via a graceful leave procedure and send, to the UE, a PDU session establishment command message, wherein the PDU session establishment command message includes a graceful leave status response IE that indicates how the network entity will handle the MT service delivery after the UE leaves the first RAN via the graceful leave procedure.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 illustrates example operations for wireless communication by a UE, in accordance with certain aspects of the present disclosure.

FIG. 6 illustrates example operations for wireless communication by a network entity, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
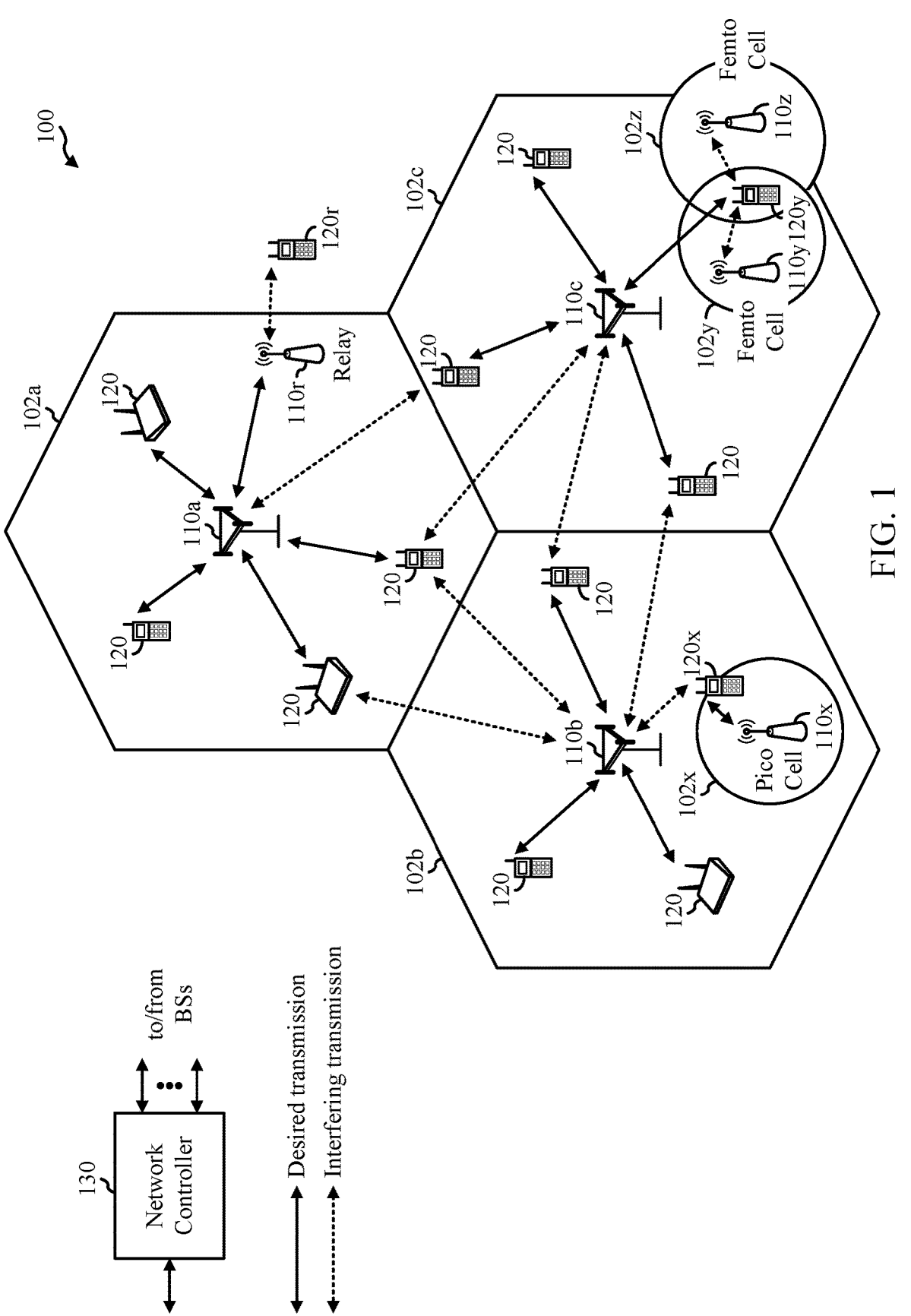
FIG. 1 is a block diagram conceptually illustrating an example telecommunications system, in accordance with certain aspects of the present disclosure.

Aspects of the present disclosure provide apparatus, methods, processing systems, and computer readable mediums that may help optimize a graceful leave procedure. The techniques described herein may enable a UE with multiple subscriber identity modules (SIMs) to coordinate with a first network, upon establishing a protocol data unit (PDU) session, how the first network will handle mobile terminated (MT) data delivery during a period when the UE leaves the first network for a second network (referred to as the leave).

This coordination may help avoid wasting network resources during the leave. This coordination may also allow the UE to avoid unnecessarily returning to the first network, given the knowledge of how MT data delivery will be handled, which may result in better performance and user experience while the UE operates in the second network. Further, performing coordination during PDU session establishment (which may be considered pre-coordination) rather than wait until a leave, may allow the UE to leave the first network quicker to connect to the second network.

Because of the potential benefits of this coordination for a UE leave, this procedure is referred to as a graceful leave procedure.

The following description provides examples of techniques for optimizing a graceful leave procedure of a UE in a communication system, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100a may include a UE 120 that supports (or operates with) multiple SIMs and is configured to perform a graceful leave procedure according to operations 500 of FIG. 5. Similarly, the wireless communication network 100a may include a base station 110 configured to perform operations 600 of FIG. 6 to assist a UE 120 in performing a graceful leave procedure.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
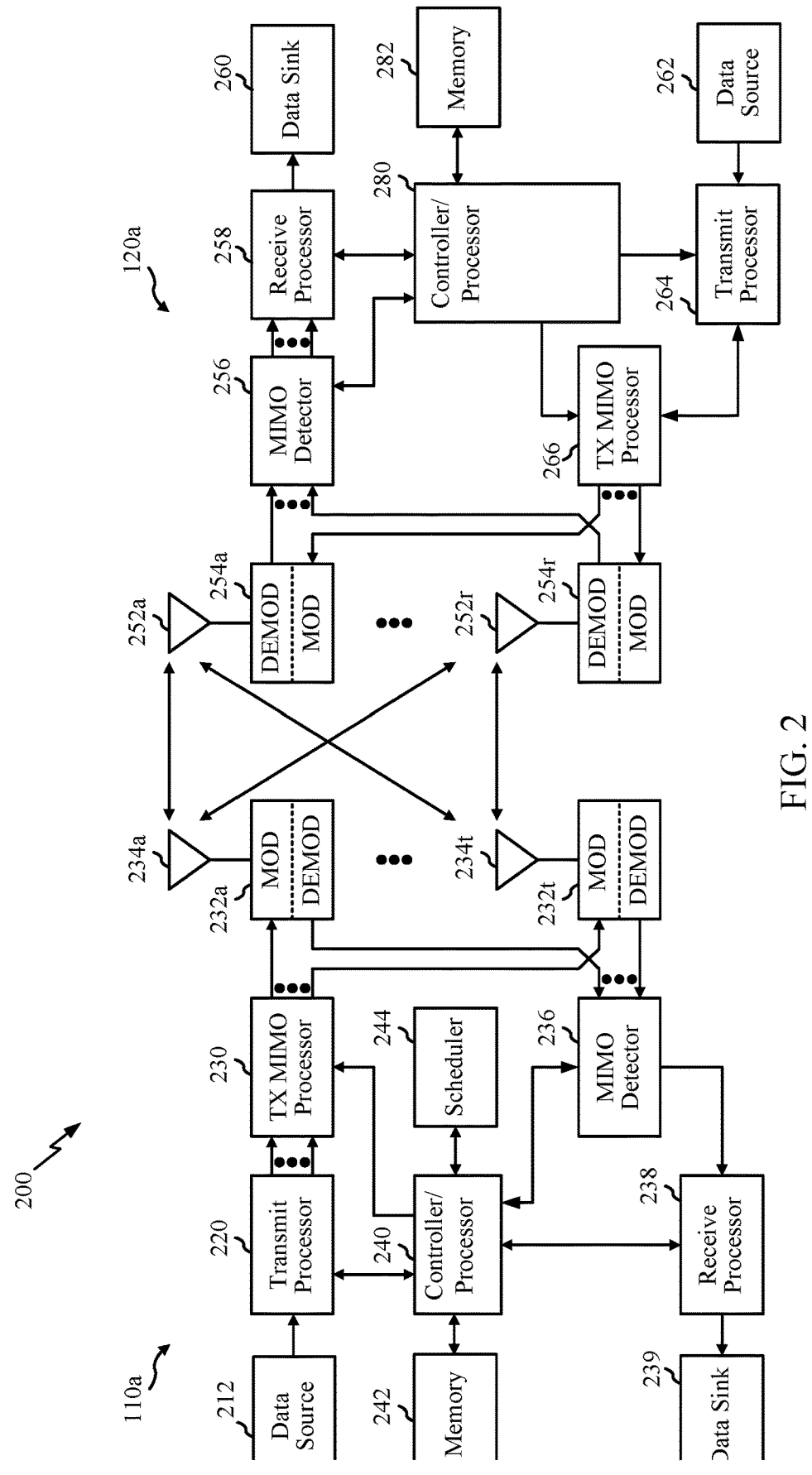
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t in transceivers. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) 254a-254r in transceivers, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, the controller/processor 280 of the UE 120a may be configured to perform operations 500 of FIG. 5. Similarly, the controller/processor 240 and/or other processors and modules at the BS 110a may perform or direct the execution of processes for the techniques described herein. For example, the controller/processor 240 of the BS 110a may be configured to perform operations 600 of FIG. 6.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as CSI related to a sidelink channel quality. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

NR concurrent radio-access technology (RAT) operation generally refers to operating multiple simultaneous active connections with at least one connection being on NR. For example, the two connections may involve LTE and NR connections, or both NR connections. Multi-SIM devices are able to connect to multiple networks independently without network awareness. Different UE behaviors may occur based on different implementations like dual-SIM dual active (DSDA) or dual-SIM dual standby (DSDS). DSDS generally refers to a dual-SIM deployment where the two SIM cards of the UE may be unable to simultaneously generate traffic. DSDA on the other hand refers to a dual-SIM deployment where both SIM cards of the UE may be active at the same time. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM receivers allow the different SIMS to support a variety of different combination options. For example, dual-SIM (DSIM) devices could support the following:

SA-NR+SA-NR: both SIMs could support standalone (SA) NR (SA-NR);

NSA-NR+LTE: one SIM supports non-standalone (NSA) while another SIM supports LTE;

LTE+LTE: both SIMs support LTE;

LTE+W: one SIM supports LTE, the other supports wideband CDMA; or any other combination (X RAT+X RAT both SIMS the same RAT or X RAT+Y RAT the SIMs support different RATs).

In some cases, in a multi-SIM deployment, each SIM of the UE can belong to the same network carrier. For example, two or more SIMs (also referred to herein as subscribers or SUBs) belonging to the same operator can be in the following modes:

(1) Idle+Idle: 2 or more SUBs in Idle camp to the same cell (2) Connected+Idle: 1 SUB in Idle and 1 Sub Connected camp to the same cell In conventional multi-SIM deployments, in scenarios where the UE is performing a low priority activity via a first SIM and another high priority activity is triggered on the same or different SIM of the UE, the high priority activity may be delayed, significantly impacting the performance of the UE. For example, assume an out of service indication is triggered on a SIM while another (or same) SIM is performing a CSG autonomous search function. In this example, the recovery from the out of service may be delayed due to the CSG autonomous search, which may involve performing measurements for multiple CSG cells, performing a full band scan to obtain a given CSG cell, etc. These measurements and band scans may utilize RF resources of the UE, causing tune aways and increasing the delay time for out of service recovery on the SIM in which the out of service indication is triggered on.

In some examples, in scenarios where a PS call/throughput is triggered on a SIM while another (or same) SIM is performing CSG autonomous search function, the triggered SIM may experience throughput degradation due to the CSG autonomous search function. In some examples, in scenarios where a SIM is not running throughput but the network sends measurement to the SIM for NR addition while another (or same) SIM is performing CSG autonomous search function, there may be a delay in NR measurements, additions/deletions/configurations, etc., in the triggered SIM, due to tune aways triggered from the CSG autonomous search function. In some examples, in scenarios where a network is running a timer for a given NR configuration on a SIM and there is a delay on that configuration, the network may delete NR object(s) and deactivate NR from that SIM.

Example Solution for PDU Session Graceful Leaving Status Indication

Figure 3:
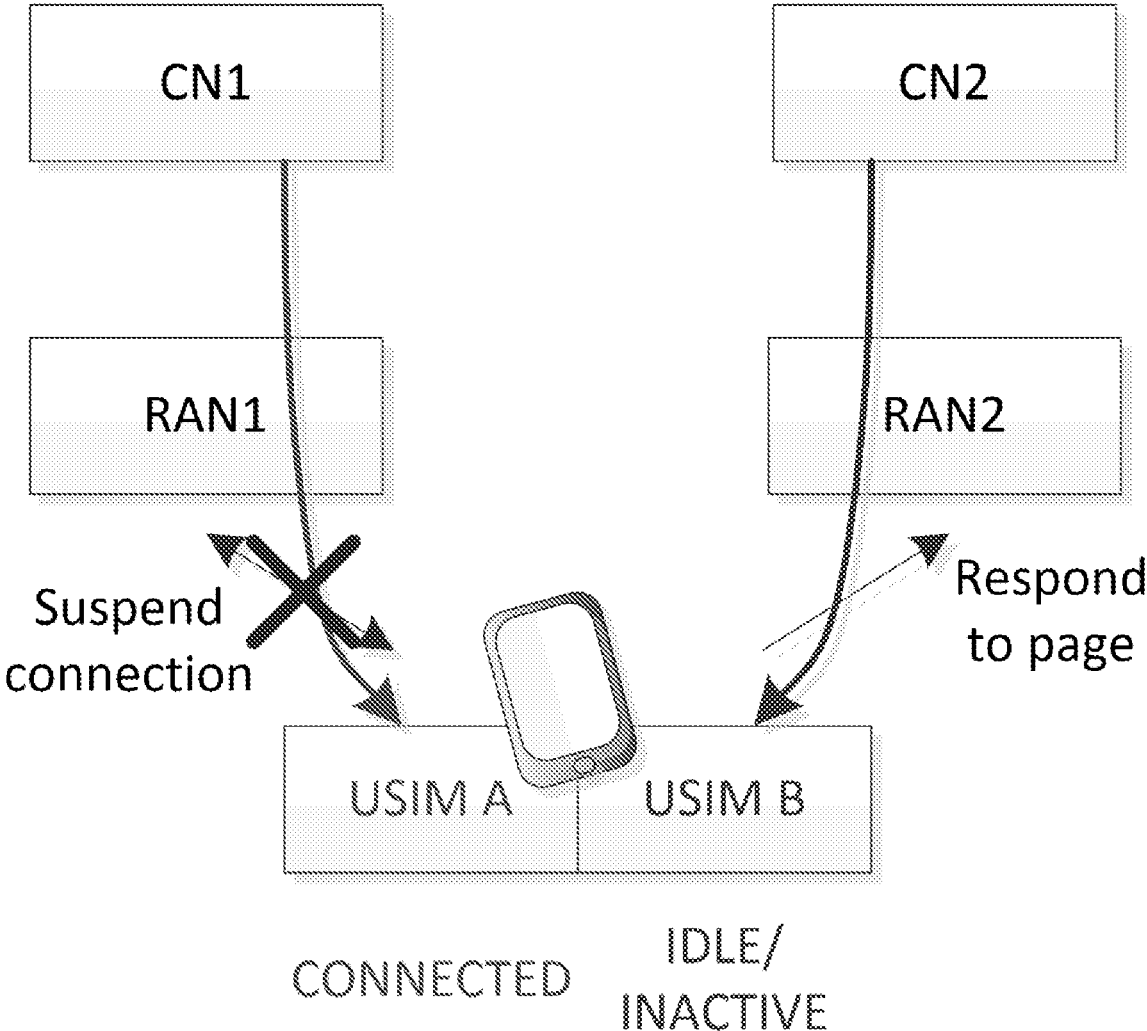
FIG. 3 illustrates an example multi-SIM deployment for a UE, in which certain aspects of the present disclosure may be practiced.

FIG. 3 illustrates an example deployment of a multi-SIM UE deployment, in which a UE supports multiple universal SIMs (USIM A and USIM B). For example, the UE may register with one radio access network (RAN1) using one SIM (USIM A) and may register with another RAN (RAN2) using another SIM (USIM B).

In some cases, USIM A and USIM B may share common radio resources. In such cases, as illustrated in the example shown, while in a connected mode in RAN1 with USIM A, the UE may need to suspend operation in RAN1 to monitor (and respond to) paging of USIM B in RAN2.

One challenge in such scenarios is how to enable the multi-USIM device to efficiently leave a current network for another network while avoiding wasting network resources during the leave. One approach to address this challenge is for the UE to coordinate with a current network, before leaving, on how mobile terminated (MT) data or MT control plane activity is handled during the leave.

Referring to the example shown in FIG. 3, the UE may coordinate with RAN1 on how RAN1 will handle MT data or MT control-plane activity occurring when the UE leaves RAN1 to listen/respond to paging in RAN2. For example, for some PDU sessions, the UE may want RAN1 to block MT data (at least temporarily) so the UE does not have to rapidly or repeatedly tune back to RAN1.

Figure 4:
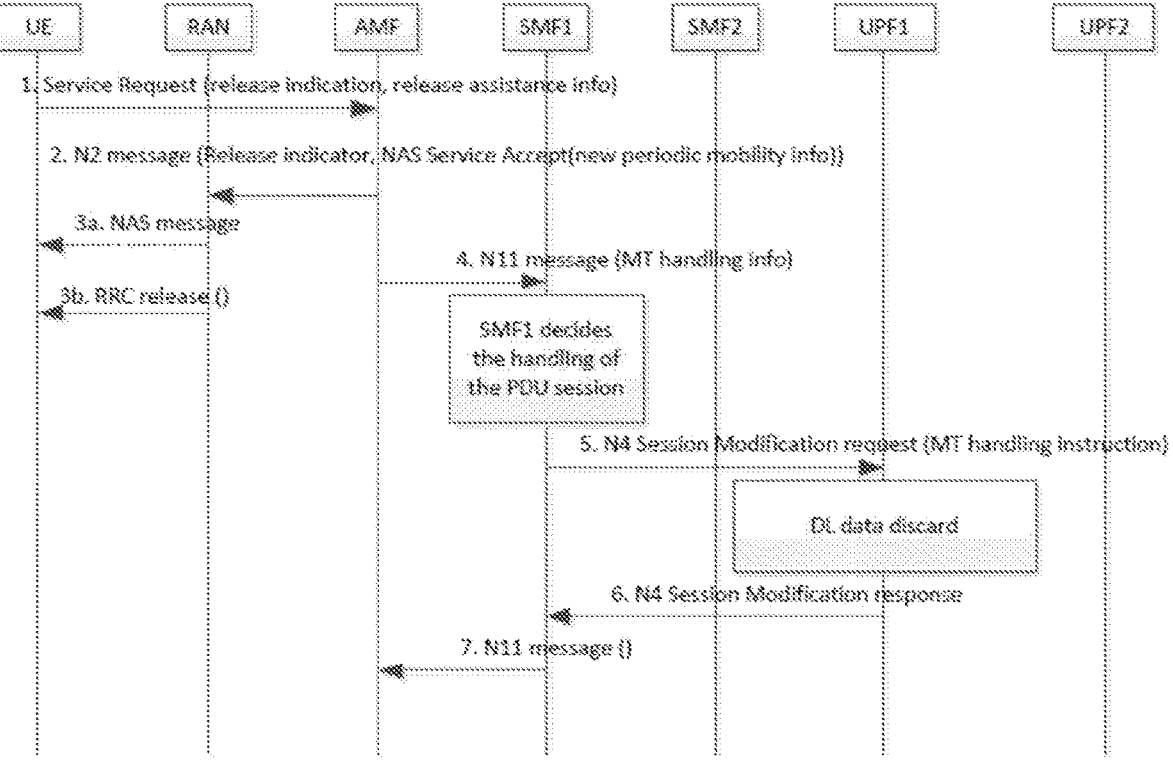
FIG. 4 is a call flow diagram that illustrates an approach for a graceful leave procedure.

FIG. 4 is a call flow diagram that illustrates an example of such coordination for a graceful leave procedure, as well as potential shortcomings.

As illustrated, in a first step (1), the UE may include (graceful) release assistance information in a non-access stratum (NAS) message sent to an access and mobility function (AMF). This message may indicate the UE is going to leave RAN1 for a period and the release information may identify one or more PDU sessions or services that the UE wants the network to trigger (or not trigger) an MT service delivery indication.

The AMF sends a NAS Service Accept message immediately in a second step (2). At a third step, the UE receives the NAS message (3*a*) and the UE goes to IDLE mode (3*b*).

Meanwhile, based on the MT handling information (from the release assistance information which may be considered a UE request), the session management function (SMF) decides the actual PDU session handling on PDU session level. For some PDU sessions, the SMF may decide to block all the downlink data without paging UE. For other PDU sessions, such as IP Multimedia Subsystem (IMS) voice sessions, the SMF may ask the UPF to block the DL data during a suspend time. After the suspend timer expiration, the UPF may be allowed to send the DL data notification to trigger paging.

The solution shown in FIG. 4 has potential issues due to conflicting objectives of the graceful leave procedure.

A first objective of the graceful leave procedure is that the UE should leave the network A (RAN 1) as soon as possible, so the UE can connect to network B (RAN 2) to limit the service interruption for USIM B. To meet this objective, the AMF sends the NAS Service Accept in step 2 before the AMF informs the SMF of the graceful leave information.

However, the SMF may only consider the graceful leave information as a request and may ultimately make different decisions for different PDU sessions. For example, while the UE may request paging be blocked for a given PDU session, the SMF may not block paging or may only block paging for that PDU session within a back-off timer.

A second objective of the graceful leave procedure is for the UE to know the decision of PDU session handling, which would allow the UE to decide if it is necessary to turn away from RAN 2 (for USIM B) to (return to) RAN 1 to listen paging for USIM A. The UE could wait for the SMF decision, which the AMF can only send in the NAS Service Accept after step 7.

In other words, the objective for the UE to know the SMF decision on PDU session handling is in direct conflict with the objective for the UE to leave the first network as soon as possible.

Aspects of the present disclosure, however, may help optimize a graceful leave procedure, for example, allowing a UE to quickly leave a first network, but with knowledge of how the how the first network will handle MT data delivery during the leave period, effectively achieving both objectives described above.

As will be described in greater detail below, this may be accomplished by coordinating, during PDU session establishment, how some of the MT data delivery will be handled during a graceful leave. This is possible because the SMF already has all the information it needs to make a decision regarding MT data deliver at this time. Because the UE already knows the SMF decision of PDU session handling before a graceful leave, the UE can quickly leave the first network and only return when necessary.

FIG. 5 illustrates example operations 500 for wireless communication by a UE, in accordance with certain aspects of the present disclosure. For example, operations 500 may be performed by a UE (e.g., UE 120a in FIG. 1 or 2) equipped with multiple SIMS (e.g., USIM A and USIM B as shown in FIG. 3).

Operations 500 begin, at 502, by sending a protocol data unit (PDU) session establishment request message to a network entity of a first radio access network (RAN). As illustrated, at 504, the UE includes, in the PDU session establishment request message, an indication of how the UE wants the network entity to handle mobile terminated (MT) service delivery after the UE leaves the first RAN via a graceful leave procedure.

FIG. 6 illustrates example operations 600 for wireless communication by a network entity and may be considered complementary to operations 500 of FIG. 5. For example, operations 600 may be performed by an SMF or by a base station (e.g., a gNB) to relay messages between the UE and an SMF)

Operations 600 begin, at 602, by receiving, from a user equipment (UE), a protocol data unit (PDU) session establishment request message, wherein the PDU session establishment request message includes a graceful leave status indication information element (IE) that indicates how the UE wants the network entity to handle mobile terminated (MT) service delivery after the UE leaves the first RAN via a graceful leave procedure. At 604, the network entity sends the UE a PDU session establishment accept message, wherein the PDU session establishment accept message includes a graceful leave status response IE that indicates how the network entity will handle the MT service delivery after the UE leaves the first RAN via the graceful leave procedure.

Figure 7:
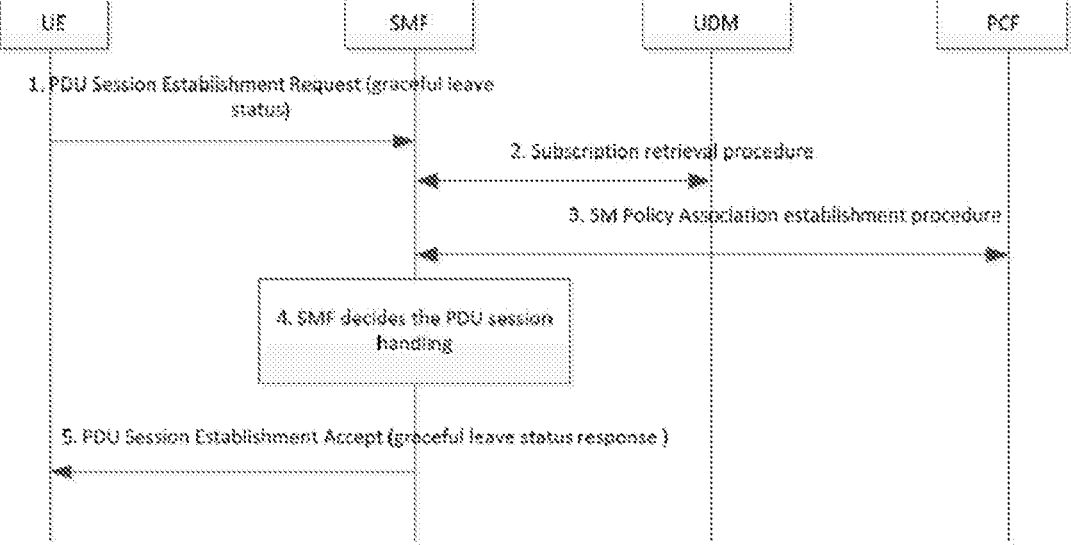
FIG. 7 is a call flow diagram that illustrates an approach for a graceful leave procedure, in accordance with certain aspects of the present disclosure.

Operations 500 and 600 of FIGS. 5 and 6 may be understood with reference to FIG. 7, which shows an example call flow diagram for the optimized graceful leave procedure proposed herein.

As illustrated, at a first step (1), when the UE requests to establish a PDU session, the UE may include a graceful leave status indication information element (IE) in the NAS PDU SESSION ESTABLISHMENT REQUEST message sent to SMF. The graceful leave status indication IE may indicate the UE wants the network to trigger (or not trigger) MT service delivery after the graceful leave (for the PDU session being established).

In order to make the ultimate decision on how to handle MT data delivery per the UE request indicated in the graceful leave status IE, the UE may need to consider the UE's subscription information and policy information. As illustrated, the SMF may retrieve the UE subscription information from a unified data management (UDM) entity, at step 2 (2) and may retrieve the policy information from a policy control function (PCF), at step 3 (3).

At step 4 (4), the SMF decides on the PDU session handling and, at step 5 (5), sends the UE a graceful leave status response IE in a NAS PDU SESSION ESTABLISHMENT ACCEPT message.

The graceful leave status response IE indicates whether the network will trigger or not trigger MT delivery, for the corresponding PDU session, after the graceful leave. For a PDU session that is allowed to trigger MT delivery, the SMF may also include a suspend timer for the PDU session. This timer indicates for how long the SMF will suspend MT delivery after receiving a Service Request with a release indication from the UE (e.g., the message sent in step 1 of FIG. 4). The purpose of this timer is to avoid collision between the UE's leaving the current network, and MT delivery.

In some cases, the UE and/or the SMF can also update the PDU session graceful leave status indication/response via the PDU session modification procedure.

If the update is initiated by the UE, the UE may include the graceful leave status indication IE in the NAS PDU SESSION MODIFICATION REQUEST message sent to SMF. The SMF may send an updated graceful leave status response IE in the NAS PDU SESSION MODIFICATION COMMAND message to UE (indicating whether the SMF accepts the update). If the update is initiated by the SMF, the SMF may simply send a PDU SESSION MODIFICATION COMMAND message to UE.

The benefits of (pre-)negotiating, during PDU session establishment, how MT data delivery will be handled during a graceful leave procedure may be understood by referring back to FIG. 4.

Assuming the UE negotiated the graceful leave procedure already when establishing PDU sessions, the UE already knows how MT data delivery for PDU sessions will be handled when it sends the service request to leave network 1, at step 1. Therefore, the UE may quickly leave to connect to network 2 and know when it needs to return. In other words, because the SMF has already performed the decision on the handling of the PDU session (during PDU session establishment) that decision block can be removed.

When performing a graceful leave, the UE may consider the graceful leave status that it received for all the established PDU sessions. In other words, the UE may have multiple PDU sessions and the UE may make a decision of whether to leave and/or when to return to network 1 by taking into account how MT delivery is handled for all of the PDU sessions. Thus, while each graceful leave status response IE may only apply to one PDU session, if UE establishes multiple PDU sessions, the UE will receive multiple graceful leave status response IE(s) that it considers.

Figure 8:
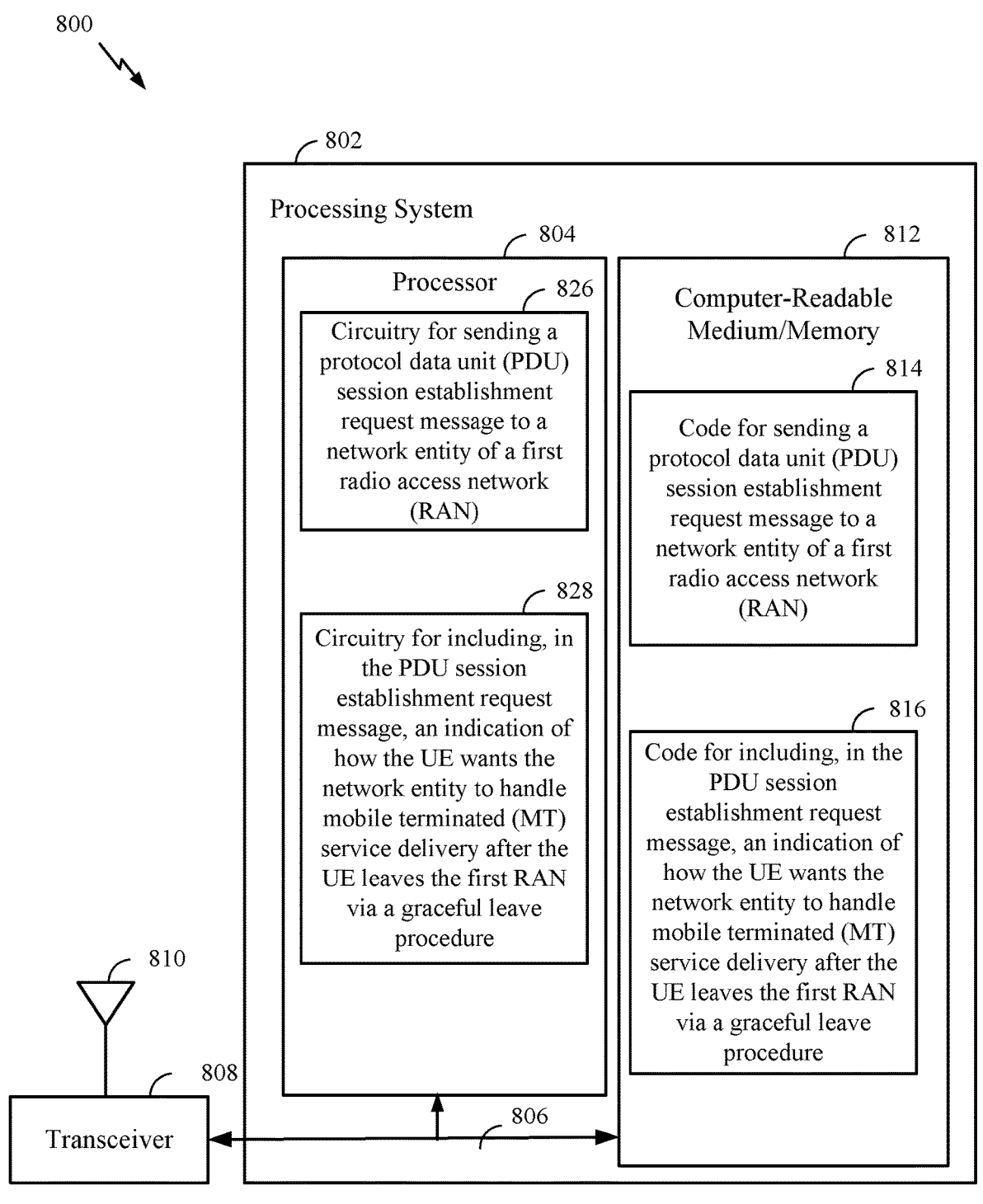
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein. In certain aspects, computer-readable medium/memory 812 stores code 814 for sending a protocol data unit (PDU) session establishment request message to a network entity of a first radio access network (RAN); and code 816 for including, in the PDU session establishment request message, an indication of how the UE wants the network entity to handle mobile terminated (MT) service delivery after the UE leaves the first RAN via a graceful leave procedure. In certain aspects, the processor 804 has circuitry configured to implement the code stored in the computer-readable medium/memory 812. The processor 804 includes circuitry 826 for sending a protocol data unit (PDU) session establishment request message to a network entity of a first radio access network (RAN); and circuitry 828 for including, in the PDU session establishment request message, an indication of how the UE wants the network entity to handle mobile terminated (MT) service delivery after the UE leaves the first RAN via a graceful leave procedure.

Figure 9:
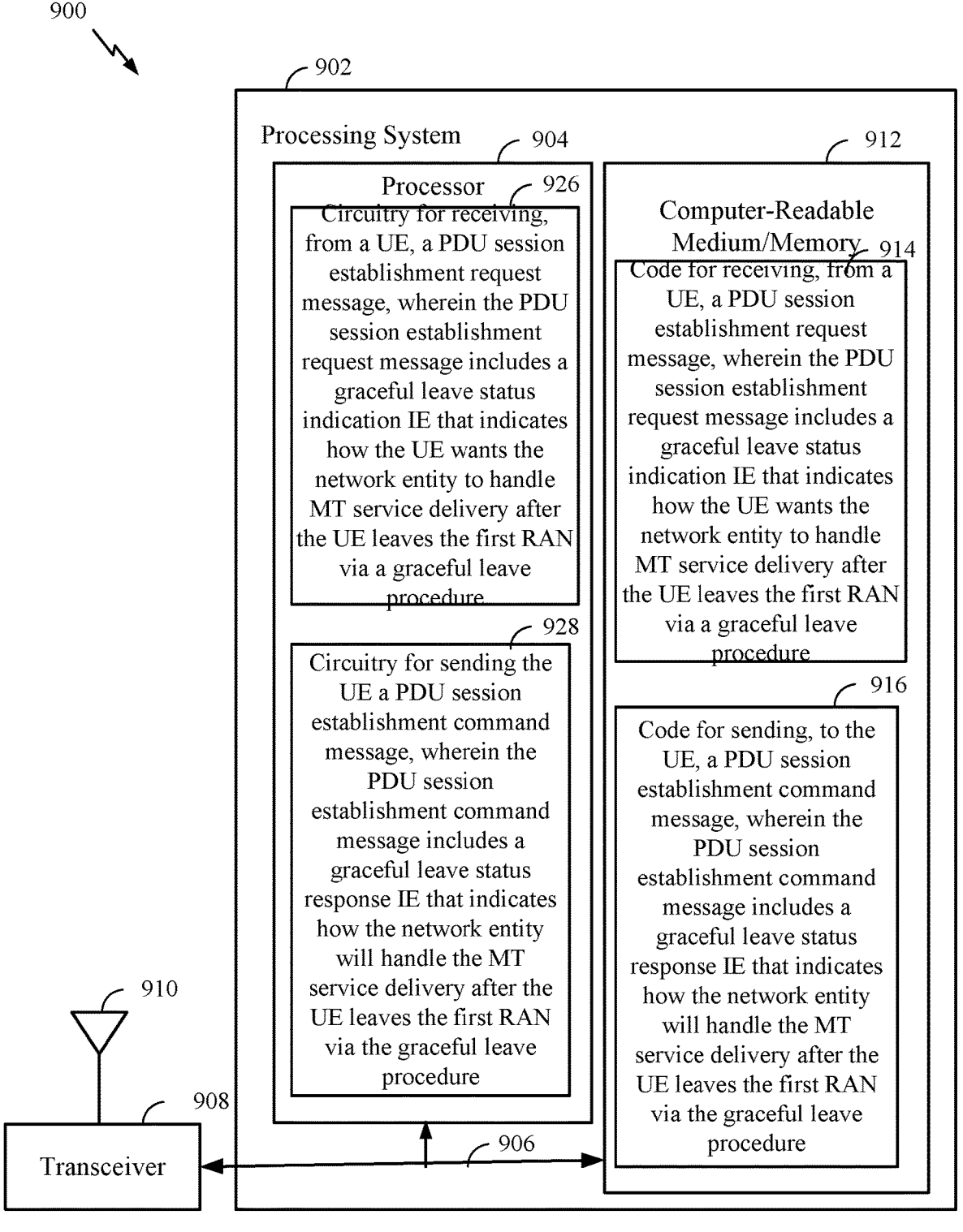
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein. In certain aspects, computer-readable medium/memory 912 stores code 914 for receiving, from a user equipment (UE), a protocol data unit (PDU) session establishment request message, wherein the PDU session establishment request message includes a graceful leave status indication information element (IE) that indicates how the UE wants the network entity to handle mobile terminated (MT) service delivery after the UE leaves the first RAN via a graceful leave procedure; and code 916 for sending the UE a PDU session establishment accept message, wherein the PDU session establishment accept message includes a graceful leave status response IE that indicates how the network entity will handle the MT service delivery after the UE leaves the first RAN via the graceful leave procedure. In certain aspects, the processor 904 has circuitry configured to implement the code stored in the computer-readable medium/memory 912. The processor 904 includes circuitry 926 for receiving, from a user equipment (UE), a protocol data unit (PDU) session establishment request message, wherein the PDU session establishment request message includes a graceful leave status indication information element (IE) that indicates how the UE wants the network entity to handle mobile terminated (MT) service delivery after the UE leaves the first RAN via a graceful leave procedure; and circuitry 928 for sending the UE a PDU session establishment accept message, wherein the PDU session establishment accept message includes a graceful leave status response IE that indicates how the network entity will handle the MT service delivery after the UE leaves the first RAN via the graceful leave procedure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 500 of FIG. 5 and/or operations 600 of FIG. 7.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for including, means for providing, means for determining, means for staying, means for blocking, and means for initiating may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
  sending a protocol data unit (PDU) session establishment request message to a network entity associated with a first radio access network (RAN);
  including, in the PDU session establishment request message, an indication of how the UE wants the network entity to handle mobile terminated (MT) service delivery after the UE leaves the first RAN via a graceful leave procedure; and
  receiving a PDU session establishment accept message, with a graceful leave status response that indicates how the network entity will handle the MT service delivery after the UE leaves the first RAN.

2. The method of claim 1, wherein the indication is included in a first graceful leave status indication information element (IE) in the PDU session establishment request message.

3. The method of claim 2, wherein the first graceful leave status indication IE indicates whether or not the UE wants the network entity to trigger MT service delivery after the UE leaves the first RAN.

4. The method of claim 3, further comprising:
  providing, via a PDU session modification procedure, an updated indication of how the UE wants the network entity to handle the MT service delivery after the UE leaves the first RAN via the graceful leave procedure; and
  receiving a graceful leave status response IE in a PDU session modification command message from the network entity.

5. The method of claim 4, wherein the updated indication is provided via a second graceful leave status indication IE in a PDU modification request message sent to the network entity.

6. The method of claim 1, wherein:
  the PDU session establishment accept message, with a graceful leave status response IE that indicates how the network entity will handle the MT service delivery is for a current and one or more other PDU sessions after the UE leaves the first RAN via the graceful leave procedure; and
  the method further comprises determining at least one of whether or when to return to the first RAN after leaving the first RAN via the graceful leave procedure, based on how the network entity will handle the MT service delivery for the one or more other PDU sessions.

7. The method of claim 6, wherein:
  if the graceful leave status response IE indicates that the network entity will trigger the MT service delivery for the current PDU session, the PDU session establishment accept message also indicates a suspend timer for one of the one or more other PDU sessions during which the MT service delivery will not be triggered.

8. The method of claim 7, further comprising:
  after the UE moves to a second RAN via the graceful leave procedure, staying in the second RAN during a connection without returning to the first RAN to listen for paging until the suspend timer expires.

9. The method of claim 6, further comprising:
  if the graceful leave status response IE indicates that the network entity will not trigger the MT service delivery, after the UE moves to a second RAN via the graceful leave procedure, staying in the second RAN during a connection without returning to the first RAN to listen for paging.

10. The method of claim 6, further comprising:
  if the graceful leave status response IE indicates that the network entity will trigger the MT service delivery for the current and the one or more other PDU sessions, staying in a second RAN during a connection without returning to the first RAN to listen for paging for at least a minimum suspend timer period.

11. A method for wireless communications by a network entity associated with a first radio access network (RAN), comprising:

receiving, from a user equipment (UE), a protocol data unit (PDU) session establishment request message, wherein the PDU session establishment request message includes a first graceful leave status indication information element (IE) that indicates how the UE wants the network entity to handle mobile terminated (MT) service delivery after the UE leaves the first RAN via a graceful leave procedure; and sending, to the UE, a PDU session establishment command message, wherein the PDU session establishment command message includes a first graceful leave status response IE that indicates how the network entity will handle the MT service delivery for a PDU session after the UE leaves the first RAN via the graceful leave procedure.

12. The method of claim 11, wherein the graceful leave status indication IE indicates whether or not the UE wants the network entity to trigger the MT service delivery after the UE leaves the first RAN.

13. The method of claim 11, further comprising:

receiving a PDU session modification request message with a second graceful leave status indication IE that indicates an updated indication of how the UE wants the network entity to handle the MT service delivery after the UE leaves the first RAN via the graceful leave procedure; and sending a PDU session modification command message with a second graceful leave status response IE.

14. The method of claim 11, wherein:

if the first graceful leave status response IE indicates that the network entity will trigger the MT service delivery, the PDU session establishment command message also indicates a suspend timer for the PDU session during which the MT service delivery will not be triggered; and the method further comprising blocking the MT service delivery, after the UE leaves the first RAN via the graceful leave procedure, until the suspend timer expires.

15. The method of claim 11, further comprising initiating a PDU session modification procedure to update the first graceful leave status for the PDU session.

16. The method of claim 15, further comprising sending, to the UE, another graceful leave status response IE with the update therein.

17. A user equipment (UE), comprising:

a transmitter configured to send a protocol data unit (PDU) session establishment request message to a network entity associated with a first radio access network (RAN);

a processing system configured to include, in the PDU session establishment request message, an indication of how the UE wants the network entity to handle mobile terminated (MT) service delivery after the UE leaves the first RAN via a graceful leave procedure; and a receiver configured to receive a PDU session establishment accept message, with a graceful leave status response that indicates how the network entity will handle the MT service delivery after the UE leaves the first RAN.

18. The UE of claim 17, wherein the indication is included in a first graceful leave status indication information element (IE) in the PDU session establishment request message.

19. The UE of claim 18, wherein the first graceful leave status indication IE indicates whether or not the UE wants the network entity to trigger MT service delivery after the UE leaves the first RAN.

20. The UE of claim 19, wherein:

the processing system is further configured to provide, via a PDU session modification procedure, an updated indication of how the UE wants the network entity to handle the MT service delivery after the UE leaves the first RAN via the graceful leave procedure; and the UE further comprises a receiver configured to receive a graceful leave status response IE in a PDU session modification command message from the network entity.

21. The UE of claim 20, wherein the updated indication is provided via a second graceful leave status indication IE in a PDU modification request message sent to the network entity.

22. The UE of claim 17, wherein:

the receiver is configured to receive the PDU session establishment accept message, with a graceful leave status response IE that indicates how the network entity will handle the MT service delivery for a current and one or more other PDU sessions after the UE leaves the first RAN via the graceful leave procedure, wherein:

the processing system is further configured to determine at least one of whether or when to return to the first RAN after leaving the first RAN via the graceful leave procedure, based on how the network entity will handle the MT service delivery for the one or more other PDU sessions.

23. The UE of claim 22, wherein:

if the graceful leave status response IE indicates that the network entity will trigger the MT service delivery for the current PDU session, the PDU session establishment accept message also indicates a suspend timer for one of the one or more other PDU sessions during which the MT service delivery will not be triggered.

24. The UE of claim 23, wherein:

after the UE moves to a second RAN via the graceful leave procedure, the UE will stay in the second RAN during a connection without returning to the first RAN to listen for paging until the suspend timer expires.

25. The UE of claim 22, wherein:

if the graceful leave status response IE indicates that the network entity will not trigger the MT service delivery, after the UE moves to a second RAN via the graceful leave procedure, the UE will stay in the second RAN during a connection without returning to the first RAN to listen for paging.

26. The UE of claim 22, wherein:

if the graceful leave status response IE indicates that the network entity will trigger the MT service delivery for the current and the one or more other PDU sessions, the UE will stay in a second RAN during a connection without returning to the first RAN to listen for paging for at least a minimum suspend timer period.

27. A network entity associated with a first radio access network (RAN), comprising:

a receiver configured to receive, from a user equipment (UE), a protocol data unit (PDU) session establishment request message, wherein the PDU session establishment request message includes a first graceful leave status indication information element (IE) that indicates how the UE wants the network entity to handle mobile terminated (MT) service delivery after the UE leaves the first RAN via a graceful leave procedure; and a transmitter configured to send, to the UE, a PDU session establishment command message, wherein the PDU session establishment command message includes a first graceful leave status response IE that indicates how the network entity will handle the MT service delivery for a PDU session after the UE leaves the first RAN via the graceful leave procedure.

28. The network entity of claim 27, wherein the first graceful leave status indication IE indicates whether or not the UE wants the network entity to trigger the MT service delivery after the UE leaves the first RAN.

29. The network entity of claim 27, wherein:

the receiver is further configured to receive a PDU session modification request message with a second graceful leave status indication IE that indicates an updated indication of how the UE wants the network entity to handle the MT service delivery after the UE leaves the first RAN via the graceful leave procedure; and the transmitter is further configured to send a PDU session modification command message with a second graceful leave status response IE.

30. The network entity of claim 27, wherein:

if the first graceful leave status response IE indicates that the network entity will trigger the MT service delivery, the PDU session establishment command message also indicates a suspend timer for the PDU session during which the MT service delivery will not be triggered;

and the network entity further comprising a processing system configured to block the MT service delivery, after the UE leaves the first RAN via the graceful leave procedure, until the suspend timer expires.

31. The network entity of claim 27, further comprising a processing system configured to initiate a PDU session modification procedure to update the first graceful leave status response IE for the PDU session.

32. The network entity of claim 31, wherein the transmitter is further configured to send, to the UE, another graceful leave status response IE with the update therein.

* * * * *